2,706,940

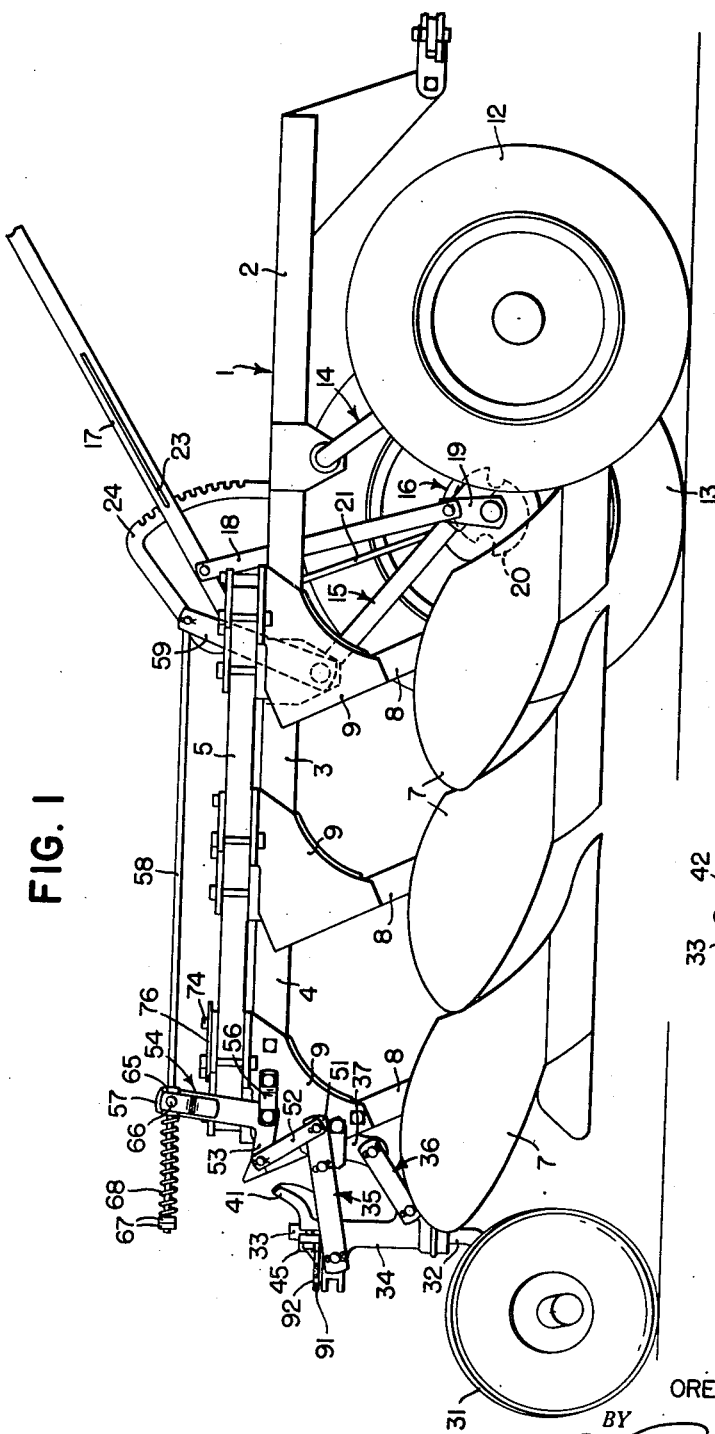
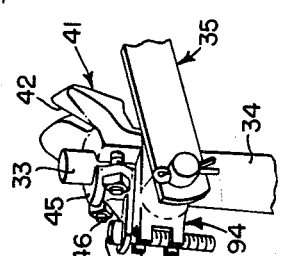

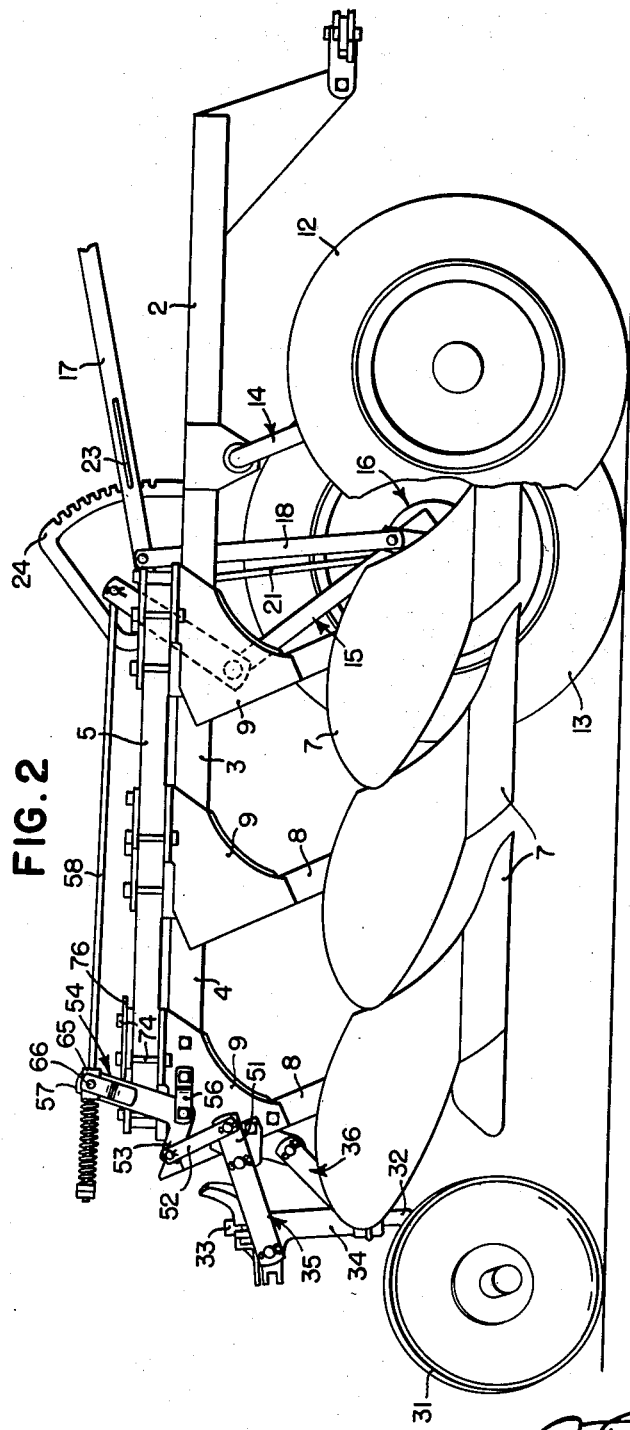
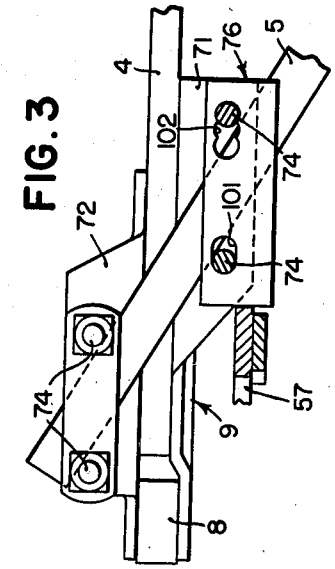
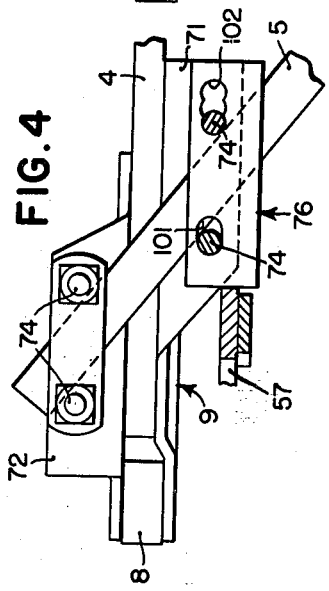

REAR END CONSTRUCTION FOR TRACTOR PLOW

Orey W. Oerman, Moline, Ill., assignor to Deere & Company, Moline, Ill., a corporation of Illinois Application December 2, 1950, Serial No. 198,838

6 Claims. (Cl. 97—127)

The present invention relates generally to agricultural implements and is more particularly concerned with ground wheel supported plows and the like in which the furrow opener carrying frame means is raised and lowered relative to the ground wheels by means of a swinging crank axle and a self-interrupting clutch actuated by the ground wheel on the crank axle.

In plows of this type, especially when operating in a position of shallow plowing, the crank axle occupies a position in which it is almost vertical when the plow is in its transport position. This results in a condition in which, when the lift clutch is tripped, the crank axle may not readily swing forwardly under the weight of the plow frame, especially under conditions where excessive resistance to forward travel of the land wheel is encountered.

The object and general nature of the present invention resides in the provision of new and improved means for exerting an assisting force tending to swing the land wheel crank axle forwardly so as to facilitate the rapid lowering of the implement into its operating position. More specifically, according to the present invention, means is provided whereby cushioning means associated with the rear furrow wheel is arranged to act against the land wheel, when the plow is raised, and to impart to the land wheel crank axle an initial movement in the lowering direction, whereby the crank axle is positively shifted forwardly out of its approximately vertical position so that the weight of the plow will then become effective to continue the forward swinging movement of the crank axle.

It is also a feature of the present invention to provide means for locking the rear furrow wheel against castering, even when the plow is raised into its transport position, to permit towing the plow at relatively high transport speeds without whipping action and to increase the effective maneuverability of the plow for transport, storage and other purposes.

These and other objects and advantages of the present invention will be apparent to those skilled in the art after a consideration of the following detailed description, taken in conjunction with the accompanying drawings, in which:

Figure 1 is a side view of a tractor drawn plow in which the principles of the present invention have been incorporated.

Figure 2 is a view similar to Figure 1, showing the plow in its raised position and the associated cushioning spring means compressed so as to act to swing the land wheel crank axle forwardly and upwardly as soon as the lifting clutch is tripped to permit the plow to lower.

Figure 3 is a fragmentary plan view, corresponding generally to a view taken along the line 3—3 of Figure 2.

Figure 4 is a view similar to Figure 3, showing how the rear wheel crank stop accommodates a different positioning of the plow beams.

Figure 5 is a fragmentary perspective view, showing the means for locking the rear wheel against castering when such action is not desired.

Referring now more particularly to Figure 1, the frame of the plow, in which the principles of the present invention have been incorporated, is indicated by the reference numeral 1 and comprises a plurality of plow beams 2, 3 and 4 suitably connected together by crossbars and by a rear, generally diagonally extending truss bar 5. Each beam carries a plow bottom 7 connected thereto by means of a generally vertically extending standard 8, the upper end of each of which is connected by a bracket 9 to the rear end of the associated beam. The front end of the plow is supported by a front furrow wheel 12 and a front land wheel 13 connected, respectively, by crank axles 14 and 15 with the plow frame 1. The crank axles 14 and 15 are suitably connected together and the crank axle 15 is provided with power lift means 16, which includes a depth-adjusting lever 17 pivotally connected with the frame and which is connected by means of a link 18 with the crank 19 of the associated half-revolution, self-interrupting clutch 20. The clutch 20 is controlled by a cable-operated trip lever 21. A clutch-lift plow of this general type is shown in the U. S. patent to Strandlund 2,179,526, issued November 14, 1939, to which reference may be made if necessary.

Swinging the depth-adjusting lever 17 from one position to another has the effect of rocking both of the crank axles 14 and 15, since they are interconnected, the lever 17 being connected by the link 18 with the crank 19, the latter normally being locked against rotation by the trip lever 21. The lever 17 carries hand-controlled detent means 23 which cooperates with a notched sector 24 carried by the plow frame. The operation of the half-revolution clutch 20, which is conventional so far as the present invention is concerned, is well understood by those skilled in the art so that further description is unnecessary, except to point out, however, that the crank axle 15 extends forwardly and downwardly in most raised positions of the plow, the crank axle 15 being more nearly vertical in the more shallow plowing positions, as illustrated in Figure 2.

The rear end construction of the plow comprises a rear furrow wheel 31 mounted for rotation on the lower, laterally outwardly turned end of a generally vertically extending crank axle 32, the upper portion 33 of which serves as a spindle that is mounted for swinging movement about a generally vertical axis in a casting member 34. The latter member is connected by a pair of vertically spaced, generally longitudinally extending links 35 and 36 to the rear bracket 9 of the plow. Preferably, the forward ends of the links 35 and 36 are pivotally connected to a bracket 37 which is readily attachable to the rear portion of the rear frame bracket 9.

A rear axle lock member 41, notched, as at 42, is fixed by suitable clamping means including a clamping cap member 45 and a pair of clamping bolts 46 to the upper end of the spindle section 33 of the crank axle 32. The upper link member 35 includes a forwardly extending section 51 which is pivotally connected by a link 52 with the rearwardly extending arm 53 of a bell crank 54 that is pivotally mounted for rocking movement on the rear plow bracket 9, by any suitable means, such as a hammer strap 56. The upwardly extending arm 57 of the bell crank 54 is connected by means of a fore-and-aft extending rod 58 with an arm 59 that is fixed to and rockable by the land wheel crank axle 15. The upper end of the bell crank section 57 carries a sleeve 65 swingably mounted on the bell crank through trunnions 66, and the rear end of the rod 58 is threaded and receives a pair of adjustable lock nuts 67. A compression spring 68 is carried by the rod 54 rearwardly of the bell crank arm 57 and ahead of the adjusting nuts 67.

The operation of the implement as so far described is substantially as follows.

Referring first to Figure 1, the depth control lever 17 is shown as disclosed in an intermediate position, and when the lever 17 is in this position, actuation of the clutch control lever 21, when the plow is in operating position, serves to cause the forward rotation of the land wheel 13 to act through the link 18 against the lever 17 and cause the land wheel crank axle 15 to swing downwardly and rearwardly substantially into the position shown in Figure 1. As the crank axle 15 swings downwardly and rearwardly, the arm 59 is rocked forwardly, which exerts a pull through the rod 58 and the rear cushioning spring 68 against the upwardly extending arm 57 of the bell crank 54. This results in a downward swinging of the rear furrow wheel axle casting 34 and the elevation of the rear end of the implement. During the raising action, the cushioning spring 68, acting between the rear end of the rod 58 and the bell crank arm 57, serves to reduce the peak lifting load of the rear end of the plow. However, when the plow is adjusted for the more shallow plowing depths the spring 68 has another function, namely, to prevent the land axle 15 from jackknifing.

The plow frame diagonal bar 5 is fixed to the flanges 71 and 72 of the side plates making up each of the frame brackets 9 by means of a plurality of pairs of clamping bolts 74. According to the present invention, I provide a rear lift crank stop member 76 which preferably is in the form of a generally elongated, rectangular plate apertured to receive the associated pair of clamping bolts 74, whereby the plate may be mounted on the plow frame directly ahead of the upwardly extending bell crank arm 57. The plate 76 is so constructed and arranged that, as best shown in Figure 2, when the depth-adjusting lever 17 is in one of its more shallow plowing positions, as shown in Figure 2, when the lift clutch 20 is actuated to raise the plow into a transport position, the bell crank arm 57 comes up against the rear end of the stop member 76 before the plow reaches its completely raised position, whereby the continued forward swinging of the land wheel crank axle arm 59, until the raising is completed, pulls forwardly on the rod 58 and places the cushioning spring 68 under compression, the rod 58 sliding forwardly through the sleeve 65 during this action. By virtue of the fact that the cushioning spring 68 is now under compression, when the plow is raised from a shallow plowing position, the spring exerts a continuous force through the rod 58 and against the arm 59 tending to swing the crank axle 15, now in a generally vertical position, forwardly in the lowering direction. However, no actual movement occurs since the clutch 20 is locked in its disengaged position and no forward swinging of the crank axle 15 is permitted until the trip lever 21 is actuated to cause the plow to lower. However, when it is desired to lower the plow and the trip lever 21 actuated, the energy stored in the compression spring 68 is instantly available to start the crank axle 15 moving forwardly even before the forward rotation of the land wheel 13 begins to act through the clutch 20 and the link 18 to swing the land wheel crank axle forwardly and upwardly. Thus, the plow lowers without hesitation, even though the land wheel 13 encounters more than normal soil resistance, as when operating in soft ground, trashy conditions or the like. The parts are so designed that the spring 68 is effective to swing the land wheel crank axle 15 forwardly, and with it the associated furrow wheel crank axle 14, until the crank axles are in such position that the weight of the forward portion of the plow is sufficient to insure the continued forward and upward swinging of the crank axles into the lowered or plowing position, even though the cushioning spring 68 no longer contacts the bell crank arm 57.

By virtue of the fact that, when the plow is raised into its transport position from one of its shallow operating positions, the bell crank arm 57 is swung into engagement with the stop member 76, the rear end construction of the present invention is in the nature of a constant lift arrangement; that is, the rear end is always raised to the same point from a shallow plowing position, irrespective of the particular position of the depth-adjusting lever 17. In the deeper plowing positions, the spring 68 serves as a cushioning spring. Further, it will also be seen that the spring 68 will be compressed an amount which is approximately proportional to the position of the depth-adjusting lever 17. That is to say, in the most shallow plowing position, in which the crank axles 14 and 15 are swung most nearly into a vertical position, the spring 68 is compressed to the greatest extent, and is therefore capable of exerting its greatest force in insuring the forward and upward swinging of the crank axles when the plow clutch is tripped to lower the plow into an operating position. Thus, the effective force of the spring 68 is automatically adjusted according to the needs for additional force to aid in lowering the plow.

Normally, the rear furrow wheel 31 is free to caster when the plow is in its transport position, in which the notch 42 is out of engagement with the upper end of the rear plow bottom standard 8. However, means is provided, according to the principles of the present invention, for locking the rear furrow wheel against castering in the transport position of the plow, so as to permit towing the plow at higher transport speeds than would otherwise be feasible. To this end, the cap 45 is provided with a rear extension 91 which is apertured, as at 92, to receive a lock pin 93. The upper portion of the rear furrow wheel casting member 34 is formed with a rearwardly extending apertured portion 94, preferably having upper and lower slots 95 and 96, to receive the lower end of the pin 93. Thus, when the rear furrow wheel is in its straight-ahead position, to lock the rear furrow wheel against castering, all that it is necessary to do is to drop the pin 93 through the aperture 92 and into the slotted boss sections or apertured portions 95 and 96. This provides a simple and easily operated means for locking the cap 45 and the rear wheel casting member 35 together so that the rear wheel cannot caster.

As best shown in Figures 4 and 5, in order to provide a stop member 76 that may be mounted on plow frames assembled for several different plowing widths, the stop plate member 76 has the rear bolt-receiving aperture 101 formed as a slot, and the forward aperture 102 is similar, being formed as three overlapping bolt holes or as an elongated slot. When the plow is arranged with the narrower bottoms, as, for example, 12-inch bottoms, the rear diagonal bar 5 makes a more acute angle with respect to the plow beams 2, 3 and 4, and hence in such a plow the clamping bolts 74 are farther apart than, as shown in Figure 4, when the plow is arranged to receive 16-inch bottoms, in which case the beams 2, 3 and 4 are farther apart than the diagonal bar 5 disposed at a somewhat less acute angle relative to the beams, and the clamping bolts 74, thus somewhat closer together than they are when the plow is arranged for 12-inch bottoms, as shown in Figure 3. The plate member 76 and the three interconnected bolt-receiving openings 102 thus provide stop means associated with the rear wheel lift crank for limiting the forward movement thereof to substantially the same position, irrespective of whether the plow is constructed and arranged to receive 12-inch bottoms, 14-inch bottoms or 16-inch bottoms.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A plow comprising frame means, rear end support means including a rear wheel swingably connected with said frame means, a lever pivoted to said frame means and connected with said rear wheel to swing the latter, a stop adjustably carried by said frame means and arranged thereon to limit movement of said lever when said rear wheel is in one position, and lift means including a spring and a part acting through the spring against said lever for swinging the latter to shift said wheel, said part being movable relative to said lever to bias said spring after said lever has been swung into engagement with said stop, said part, lever and spring being so constructed and arranged that the bias imparted to said spring following movement of said part after the latter has moved said lever against said stop is transmitted through said part back to said lift means.

2. A plow comprising frame means, rear end support means including a rear wheel swingably connected with said frame means, a lever pivoted to said frame means and connected with said rear wheel to swing the latter, a stop carried by said frame means and arranged thereon to limit movement of said lever when said rear wheel is in one position, and lift means including a spring and a part acting through the spring against said lever for swinging the latter to shift said wheel, said part being movable relative to said lever to bias said spring after said lever has been swung into engagement with said stop, said part, lever and spring being so constructed and arranged that the bias imparted to said spring following movement of said part after the latter has moved said lever against said stop is transmitted through said part back to said lift means.

3. A plow comprising frame means, rear end support means including a shiftable rear wheel and a pivoted lever connected to shift the rear wheel, a crank axle journaled on said frame for generally downward and rearward swinging movement into an approximately vertical position, a part on said frame disposed in front of said lever, whereby when the latter is swung in a forward direction through a given distance the lever engages said part and is limited in its forward movement thereby, means for swinging said crank axle, and means connecting the last mentioned means with said lever, including a spring and a part acting through the spring against said lever for shifting the latter into contact with said part on the frame, said connecting part being movable relative to said lever after the latter is in contact with said frame part so as to bias said spring and cause the latter to react through said lever and the part on the frame forward thereof for imparting movement to said crank axle.

4. In a plow of the type having a frame, a crank axle journaled on said frame for generally downward and rearward swinging movement into an approximately vertical position, a ground wheel on the swinging end of said crank axle, and wheel-operated, self-interrupting clutch means acting between said frame and said crank axle for swinging the latter, the improvement which includes a rear end construction comprising a shiftable rear wheel, a lever adapted to be pivoted on said frame and connected to shift said rear wheel, a part on said frame disposed in front of said lever, whereby when the latter is swung in a forward direction through a given distance the lever engages said part and is limited in its forward movement thereby, and means for connecting said lever with said crank axle, whereby said lever is shifted in a forward direction against said part by movement of said crank axle in a downward and rearward direction, said connecting means including a spring and a part acting through the spring against said lever for shifting the latter into contact with said part on the frame, said connecting part being movable relative to said lever after the latter is in contact with said frame part so as to bias said spring and cause the latter to react through said lever and the part on the frame forward thereof for imparting movement to said crank axle to swing the latter upwardly and forwardly relative to said frame.

5. A plow comprising frame means including a plurality of generally parallel plow beams, adapted to be connected together with said beams disposed different distances apart to accommodate different widths of plow bottoms, a truss bar extending diagonally across the rear portions of said beams, said bar being disposed at different angles relative to said beams in the different lateral spacing of the latter, and means for clamping said bar to said beams, including bolt-receiving parts disposed parallel to said beams and having bolt-receiving openings and bolts passing therethrough at front and rear sides of said bar, said openings being slotted to accommodate different positions of said bolts when the bar is disposed in different angular positions relative to said beams, a stop plate disposed on the upper side over one of said apertured parts to receive the associated bolts and adjustable relative to the latter so as to receive said bolts in any position of said diagonal bar relative to said beams, rear end support means for said frame including a rear wheel swingably connected with said frame, a lever pivoted to said frame substantially directly in rear of said stop plate and connected with said rear wheel to swing the latter, said stop plate serving to limit forward movement of said lever when said rear wheel is shifted in a direction to raise the rear end of the plow frame, and means including a spring and a part acting through the spring against said lever for swinging the latter to shift said wheel, said part being movable relative to said lever to bias said spring after said lever has been swung into engagement with said stop plate.

6. An agricultural implement comprising a tool carrying frame, a crank axle journaled thereon, adjusting means operable through a given range for swinging said crank axle to adjust the operating position of said frame, mechanism operative through a predetermined range of movement and reacting against said means for swinging said crank axle to raise and lower said frame, a movable support connected with said frame, a member movably mounted on said frame and operatively connected with said support for shifting the same relative to said frame, a stop carried on said frame in a position to be engaged by said member for limiting the movement thereof relative to said frame in one direction, a connecting member extending from said crank axle to said first mentioned member, and spring means connecting said members whereby, before said first member engages said stop said first member serves to cushion the application of a lifting force transmitted from said connecting member to said first member and the latter is free to move in either direction relative to said frame, said stop being disposed on said frame in such position that, when said adjusting means is closely adjacent one of its end positions, actuation of said mechanism through said predetermined range acts through said crank axle and said connecting member to swing said crank axle into a frame-raising position and to bring said first member into engagement with said stop, whereby when said mechanism is operated with said adjusting means close to its said end position, said spring means is biased to start the movement of said crank axle toward its frame-lowering position.

References Cited in the file of this patent

UNITED STATES PATENTS

| | | |
|---|---|---|
| 1,302,016 | Dickinson | Apr. 29, 1919 |
| 2,184,403 | Strandlund | Dec. 26, 1939 |
| 2,334,888 | Strandlund | Nov. 23, 1943 |
| 2,340,495 | Strandlund | Feb. 1, 1944 |
| 2,383,022 | Strandlund | Aug. 21, 1945 |